UNITED STATES PATENT OFFICE.

FRANCESCO PUCILLO, OF GENOA, ITALY.

TREATMENT OF ALUMINIUM TO RENDER IT UNALTERABLE.

1,130,196.     Specification of Letters Patent.     Patented Mar. 2, 1915.

No Drawing.     Application filed February 6, 1911. Serial No. 606,982.

*To all whom it may concern:*

Be it known that I, FRANCESCO PUCILLO, subject of the King of Italy, and resident of Conservatore del Mare 9–13, Genoa, Italy, engineer, have invented a new and useful Improved Treatment of Aluminium to Render it Unalterable, of which the following is a specification.

Aluminium is subject to attack not only by acids and alkalis but also by many other agents, a fact which limits considerably the application of this metal.

My invention relates to a treatment of aluminium for the purpose of making it incapable of being attacked by all external influences of whatever nature, even at very high temperatures. The treatment may be applied to castings, sheets, wires or tubes, in fact to any object of aluminium.

The process of treatment involves the following operations:

1. The aluminium object which is to be rendered unalterable is first treated with an alkaline solution 15–20%, then neutralized by acidified water and washed with pure water with a view to make the objects adapted for the subsequent treatments.

2. It is then treated with solutions of chlorids beginning, for example, with chlorid of iron 2.5–4%, chlorid of zinc 0.8–1%, chlorid of tin 6.5–10% and chlorid of ammonium 6.5–10%, of which solutions the rest is water. These proportions may somewhat vary according to the quality of the aluminium.

3. These operations are succeeded by a treatment of the object with an ammoniacal solution of copper chlorid with addition of 1% tartrates, such as sodium tartrate and calcium tartrate about 4–9%. By this treatment there will be formed upon the surface of the aluminium a coating of metallic oxidation which is so adherent to the metal that it cannot be separated therefrom. This coating is strengthened by means of the following operations.

4. The object is next subjected to the action of alcoholic zinc acetate about 5% and neutralized by an aqueous solution of sodium carbonate, potassium carbonate or other alkaline carbonate.

5. The next operation is a treatment with acidified water (for instance water acidified with sulfuric or nitric acid 3–5%) and the object is then carefully washed and cleaned and then heated to a temperature above 100° C. (advantageously 350° C.) By the treatment carried on to this point there is formed at the surface of the aluminium a compound of this metal with the metals and compounds of metals with which the object has been treated: the coating thus produced, and which is of black lustrous color is strongly united with the aluminium and able to support any mechanical working without being detached from the metal. If the treatment be now stopped the object is adapted to receive on its surface any metallic deposit; for example it may be coated with nickel, cobalt, silver, or the like, either electrolytically or otherwise; it may even be varnished. This is an important result achieved by the invention, but if the object is to be rendered completely incapable of being attacked by external influences, the treatment is continued in the following manner:

6. The object is washed with a solution of crude mineral oil, drying oils and balsams, mixed with a small proportion of gum-resins. The mixture, before being used, should be treated with oxygen or with an appropriate oxidizing agent. This oxidation is necessary to prepare the liquid for its transformation upon the surface of the aluminium into an insoluble and inattackable coating of carbon and hydrocarbon.

7. Finally the object is completely dried by heat and washed with hot caustic soda or some other energetic alkali.

The aluminium, after being subjected to the complete treatment such as has been just indicated, resists the attack of alkalis, acids and all other substances, notably sea-water. It can be painted and varnished and the paint or varnish can be subsequently removed by means of hot alkali or other detergent without fear that the surface of the object will be in any way altered. Aluminium treated in this manner becomes applicable for electric cables, for marine naval constructions and for many other purposes.

What I claim is:

1. A process of treatment of aluminium consisting in: (*a*) treating the aluminium object with an alkaline solution, neutralizing it by acidified water and washing it with pure water; (*b*) then treating said object with solutions of chlorids; (*c*) then treating it with an ammoniacal solution of copper chlorid with addition of tartrates; (*d*) treating it afterward by alcoholic zinc acetate and neutralizing it by an aqueous solution of an alkaline carbonate; (e) then treating it by acidified water, washing and cleaning it carefully and heating it to a temperature above 100° C.

2. A process of treatment of aluminium consisting in: (a) treating the aluminium object with an alkaline solution, neutralizing it by acidified water and washing it with pure water; (b) then treating said object with solutions of chlorids; (c) then treating it with an ammoniacal solution of copper chlorid with addition of tartrates; (d) treating it afterward by alcoholic zinc acetate and neutralizing it by an aqueous solution of an alkaline carbonate; (e) then treating it by acidified water, washing and cleaning it carefully and heating it to a temperature above 100° C.; (f) then washing the object with a hot solution of crude mineral oil, drying oils and balsams, mixed with a small proportion of gum-resins, the mixture being treated with an oxidizing agent before being used; (g) finally, completely drying the object by heat and washing it with a hot energetic alkali.

In testimony, that I claim the foregoing as my invention, I have signed my name in presence of two witnesses, this 21st day of January, 1911.

FRANCESCO PUCILLO.

Witnesses:
 DEAN M. MASON,
 ALCIDE FABE.